US009739205B2

(12) United States Patent
Schwarz et al.

(10) Patent No.: US 9,739,205 B2
(45) Date of Patent: Aug. 22, 2017

(54) GEARED TURBOFAN WITH A GEARBOX UPSTREAM OF A FAN DRIVE TURBINE

(71) Applicant: United Technologies Corporation, Hartford, CT (US)

(72) Inventors: Frederick M. Schwarz, Glastonbury, CT (US); Gabriel L. Suciu, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 315 days.

(21) Appl. No.: 14/573,812

(22) Filed: Dec. 17, 2014

(65) Prior Publication Data

US 2015/0176497 A1     Jun. 25, 2015

Related U.S. Application Data

(60) Provisional application No. 61/919,831, filed on Dec. 23, 2013.

(51) Int. Cl.
| | | |
|---|---|---|
| *F02C 7/32* | (2006.01) | |
| *F02C 7/36* | (2006.01) | |
| *F02K 3/06* | (2006.01) | |
| *F02C 3/107* | (2006.01) | |

(52) U.S. Cl.
CPC .............. *F02C 7/36* (2013.01); *F02C 3/107* (2013.01); *F02K 3/06* (2013.01); *F05D 2260/4031* (2013.01); *F05D 2260/40311* (2013.01)

(58) Field of Classification Search
CPC .... F01D 1/24; F02C 3/04; F02C 3/067; F02C 3/073; F02C 7/32; F02C 7/36
See application file for complete search history.

(56) References Cited

U.S. PATENT DOCUMENTS

| | | |
|---|---|---|
| 3,287,906 A | 11/1966 | McCormick |
| 3,363,831 A * | 1/1968 | Garnier ................ F01D 5/022 |
| | | 415/65 |
| 3,754,484 A | 8/1973 | Roberts |
| 3,892,358 A | 7/1975 | Gisslen |
| 4,130,872 A | 12/1978 | Harloff |
| 4,969,325 A | 11/1990 | Adamson et al. |

(Continued)

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

Ciepluch et al., Quiet, Powered-Lift Propulsion, NASA Conference Publication 2077, Nov. 14-15, 1978 (429 pages)—Broken down to Report 1 through Report 8.

(Continued)

*Primary Examiner* — Igor Kershteyn
(74) *Attorney, Agent, or Firm* — Carlson, Gaskey & Olds, P.C.

(57) ABSTRACT

A gas turbine engine according to an example of the present disclosure includes a drive turbine configured to drive a fan section, a combustor section located axially upstream of the drive turbine, and a speed change mechanism located axially downstream of the combustor section and axially upstream of the drive turbine. An output of the speed change mechanism connects to the fan.

23 Claims, 3 Drawing Sheets

(56) References Cited

U.S. PATENT DOCUMENTS

| | | | |
|---|---|---|---|
| 5,433,674 | A | 7/1995 | Sheridan et al. |
| 5,447,411 | A | 9/1995 | Curley et al. |
| 5,524,847 | A | 6/1996 | Brodell et al. |
| 5,778,659 | A | 7/1998 | Duesler et al. |
| 5,857,836 | A | 1/1999 | Stickler et al. |
| 5,915,917 | A | 6/1999 | Eveker et al. |
| 5,975,841 | A | 11/1999 | Lindemuth et al. |
| 6,223,616 | B1 | 5/2001 | Sheridan |
| 6,318,070 | B1 | 11/2001 | Rey et al. |
| 6,619,030 | B1 | 9/2003 | Seda et al. |
| 6,763,654 | B2 * | 7/2004 | Orlando .............. F01D 1/24 415/69 |
| 6,814,541 | B2 | 11/2004 | Evans et al. |
| 7,021,042 | B2 | 4/2006 | Law |
| 7,513,102 | B2 | 4/2009 | Moniz et al. |
| 7,591,754 | B2 | 9/2009 | Duong et al. |
| 7,594,388 | B2 | 9/2009 | Cherry et al. |
| 7,824,305 | B2 | 11/2010 | Duong et al. |
| 7,841,165 | B2 | 11/2010 | Orlando et al. |
| 7,926,260 | B2 | 4/2011 | Sheridan et al. |
| 7,950,220 | B2 | 5/2011 | Merry et al. |
| 8,015,798 | B2 | 9/2011 | Norris et al. |
| 8,205,432 | B2 | 6/2012 | Sheridan |
| 2009/0191045 | A1 | 7/2009 | Suciu et al. |
| 2010/0148396 | A1 | 6/2010 | Xie et al. |
| 2010/0154384 | A1 | 6/2010 | Schilling |
| 2010/0331139 | A1 | 12/2010 | McCune |
| 2012/0121378 | A1 * | 5/2012 | Sheridan ............ F01D 25/18 415/1 |

OTHER PUBLICATIONS

Performance and Weight Estimates for an Advanced Open Rotor Engine, Eric S. Hendricks and Michael T. Tong, NASA/TM-2012-217710, AIAA-2012-3911, Sep. 2012.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K, Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines- Turbofan. Feb. 8, 2012.

Ivchenko-Progress Al-727M. Jane's Aero-engines, Aero-engines-Turbofan. Nov. 27, 2011.

Ivchenko-Progress D-727. Jane's Aero-engines, Aero-engines- Turbofan. Feb. 7, 2007.

Turbomeca Aubisque. Jane's Aero-engines, Aero-engines- Turbofan. Nov. 2, 2009.

(56) References Cited

OTHER PUBLICATIONS

Aviadvigatel D-110. Jane's Aero-engines, Aero-engines- Turbofan. Jun. 1, 2010.
Rolls-Royce M45H. Jane's Aero-engines, Aero-engines- Turbofan. Feb. 24, 2010.
Honeywell LF502. Jane's Aero-engines, Aero-engines- Turbofan. Feb. 9, 2012.
Honeywell LF507. Jane's Aero-engines, Aero-engines- Turbofan. Feb. 9, 2012.
Honeywell TFE731. Jane's Aero-engines, Aero-engines- Turbofan. Jul. 18, 2012.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.

\* cited by examiner

GEARED TURBOFAN WITH A GEARBOX UPSTREAM OF A FAN DRIVE TURBINE

CROSS-REFERENCE TO RELATED APPLICATIONS

This application claims priority to U.S. Provisional Application No. 61/919,831, which was filed on Dec. 23, 2013 and is incorporated herein by reference.

BACKGROUND

A gas turbine engine may include a fan section, a compressor section, a combustor section, and a turbine section. Air entering the compressor section is typically compressed and delivered into the combustor section where it is mixed with fuel and ignited to generate a high-speed exhaust gas flow. The high-speed exhaust gas flow typically expands through the turbine section to drive the compressor and the fan section. Among other variations, the compressor section can include low and high pressure compressors, and the turbine section can include low and high pressure turbines.

Typically, a high pressure turbine drives a high pressure compressor through an outer shaft to form a high spool, and a low pressure turbine drives a low pressure compressor through an inner shaft to form a low spool. The fan section may also be driven by the inner shaft. A direct drive gas turbine engine may include a fan section driven by the low spool such that a low pressure compressor, low pressure turbine, and fan section rotate at a common speed in a common direction.

A speed reduction device, which may be a fan drive gear system or other mechanism, may be utilized to drive the fan section such that the fan section rotates at a different speed than the turbine section. This allows for an overall increase in propulsive efficiency of the engine. In such engine architectures, a shaft driven by one of the turbine sections provides an input to the speed reduction device that drives the fan section at a reduced speed such that both the turbine section and the fan section can rotate at closer to optimal speeds.

Although gas turbine engines utilizing speed change mechanisms are generally known to be capable of improved propulsive efficiency relative to conventional engines, gas turbine engine manufacturers continue to seek further improvements to engine performance including improvements to thermal, transfer and propulsive efficiencies.

SUMMARY

A gas turbine engine according to an example of the present disclosure includes a drive turbine configured to drive a fan section, a combustor section located axially upstream of the drive turbine, and a speed change mechanism located axially downstream of the combustor section and axially upstream of the drive turbine. An output of the speed change mechanism connects to the fan.

In a further embodiment of any of the foregoing embodiments, the speed change mechanism is an epicyclical gearbox.

In a further embodiment of any of the foregoing embodiments, the speed change mechanism includes a ring gear connected to a fan drive shaft.

In a further embodiment of any of the foregoing embodiments, the speed change mechanism includes a planetary carrier connected to a fan drive shaft.

In a further embodiment of any of the foregoing embodiments, the speed change mechanism includes a sun gear connected to the drive turbine.

In a further embodiment of any of the foregoing embodiments, the speed change mechanism is a planetary gear system.

In a further embodiment of any of the foregoing embodiments, the speed change mechanism is a star gear system.

In a further embodiment of any of the foregoing embodiments, the speed change mechanism is located immediately upstream of the drive turbine.

A further embodiment of any of the foregoing embodiments includes a fan drive shaft connected to the fan and a low pressure compressor connected to the fan drive shaft.

A further embodiment of any of the foregoing embodiments includes a first compressor immediately downstream of the fan section and immediately upstream of the combustor section.

A further embodiment of any of the foregoing embodiments includes a high pressure turbine and an intermediate turbine, wherein the speed change mechanism is located immediately downstream of the intermediate turbine and upstream of the drive turbine.

In a further embodiment of any of the foregoing embodiments, the high pressure turbine is axially upstream of the intermediate turbine.

A further embodiment of any of the foregoing embodiments includes a low pressure compressor and a high pressure compressor, wherein the low pressure compressor is connected with the intermediate turbine and the high pressure compressor is connected with the high pressure turbine.

In a further embodiment of any of the foregoing embodiments, the gas turbine engine is a three spool gas turbine engine.

In a further embodiment of any of the foregoing embodiments, the speed change mechanism is an epicyclical gearbox.

A method of operating a gas turbine engine according to an example of the present disclosure includes rotating a fan drive turbine to create a first rotational speed and reducing the first rotational speed output to a second rotational speed axially downstream of a second turbine section.

In a further embodiment of any of the foregoing embodiments, a speed change mechanism reduces the first rotational speed of the fan drive turbine to the second rotational speed.

In a further embodiment of any of the foregoing embodiments, the speed change mechanism is an epicyclical gearbox.

A further embodiment of any of the foregoing embodiments includes rotating a fan and a compressor at the second rotational speed.

In a further embodiment of any of the foregoing embodiments, the gas turbine engine is a three spool gas turbine engine.

The various features and advantages of this disclosure will become apparent to those skilled in the art from the following detailed description. The drawings that accompany the detailed description can be briefly described as follows.

DETAILED DESCRIPTION

Figure 1:
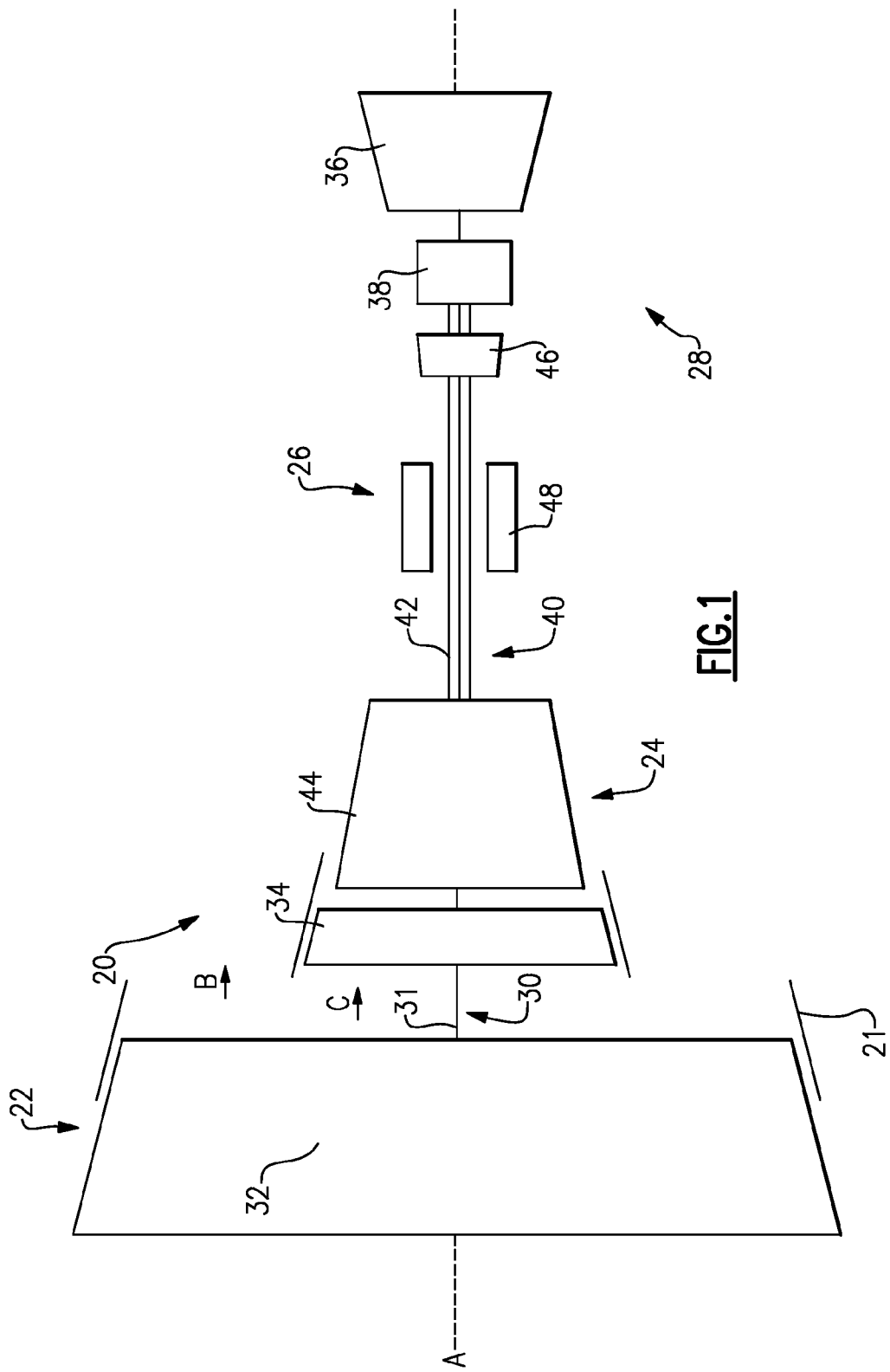
FIG. 1 illustrates a schematic view of a gas turbine engine according to an example embodiment.

FIG. 1 schematically illustrates a gas turbine engine 20. The gas turbine engine 20 generally incorporates a fan section 22, a compressor section 24, a combustor section 26, and a turbine section 28. The fan section 22 drives air along a bypass flow path B in a bypass duct defined within a nacelle or housing 21, while the compressor section 24 drives air along a core flow path C for compression and communication into the combustor section 26 then expansion through the turbine section 28.

The exemplary engine 20 generally includes a low speed spool 30 and a high speed spool 40 mounted for rotation about an engine central longitudinal axis A. The low speed spool 30 generally includes an inner shaft 31. The inner shaft 31 interconnects a fan 32, a first (or low) pressure compressor 34 with a first (or low) pressure turbine 36 through a speed change mechanism, which in the exemplary gas turbine engine 20 is illustrated as a geared architecture 38. In one example, the low pressure turbine 36 is attached to a sun gear of the geared architecture 38 and the fan 32 and the low pressure compressor 34 are attached to a ring gear of the geared architecture 38 via shaft 31, which extends through shaft 42.

A high speed spool 40 includes an outer shaft 42 that interconnects a second (or high) pressure compressor 44 and a second (or high) pressure turbine 46. A combustor 48 is arranged in the exemplary gas turbine engine 20 axially between the high pressure compressor 44 and the high pressure turbine 46. The inner shaft 31 and the outer shaft 42 are concentric and rotate about the engine central longitudinal axis A which is collinear with their longitudinal axes.

The low pressure turbine 36 rotates at a first rotational speed and the geared architecture 38 reduces the first rotational speed to a second rotational speed axially downstream of the high pressure turbine 46. The fan 32 and the low pressure compressor 34 both rotate at the second rotational speed. The high pressure compressor 44 and the high pressure turbine 46 rotate at a third rotational speed different from the first and second rotational speed.

The core airflow C is compressed by the low pressure compressor 34 and the high pressure compressor 44, mixed and burned with fuel in the combustor 48 then expanded over the high pressure turbine 46 and the low pressure turbine 36. The turbines 46 and 36 rotationally drive the respective high speed spool 40 and low speed spool 30 in response to the expansion.

The engine 20 in one example is a high-bypass geared aircraft engine. In a further example, the engine 20 bypass ratio is greater than about six (6), with an example embodiment being greater than about ten (10), the geared architecture 38 is an epicyclic gear train such as a planetary gear system, a star gear system, or other gear system. The gear reduction ratio of greater than about 2.3 at the low pressure turbine 36. A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second. The Low Corrected Fan Tip Speed according to another non-limiting embodiment of the example gas turbine engine 20 is less than about 1400 ft/second.

An overall pressure ratio is a pressure ratio between a leading edge of a fan blade of the fan 32 and the trailing edge of the compressor section 24. In one non-limiting embodiment, the overall pressure ratio is greater than approximately 30. In another non-limiting embodiment, the overall pressure ratio is less than approximately 70.

Figure 2:
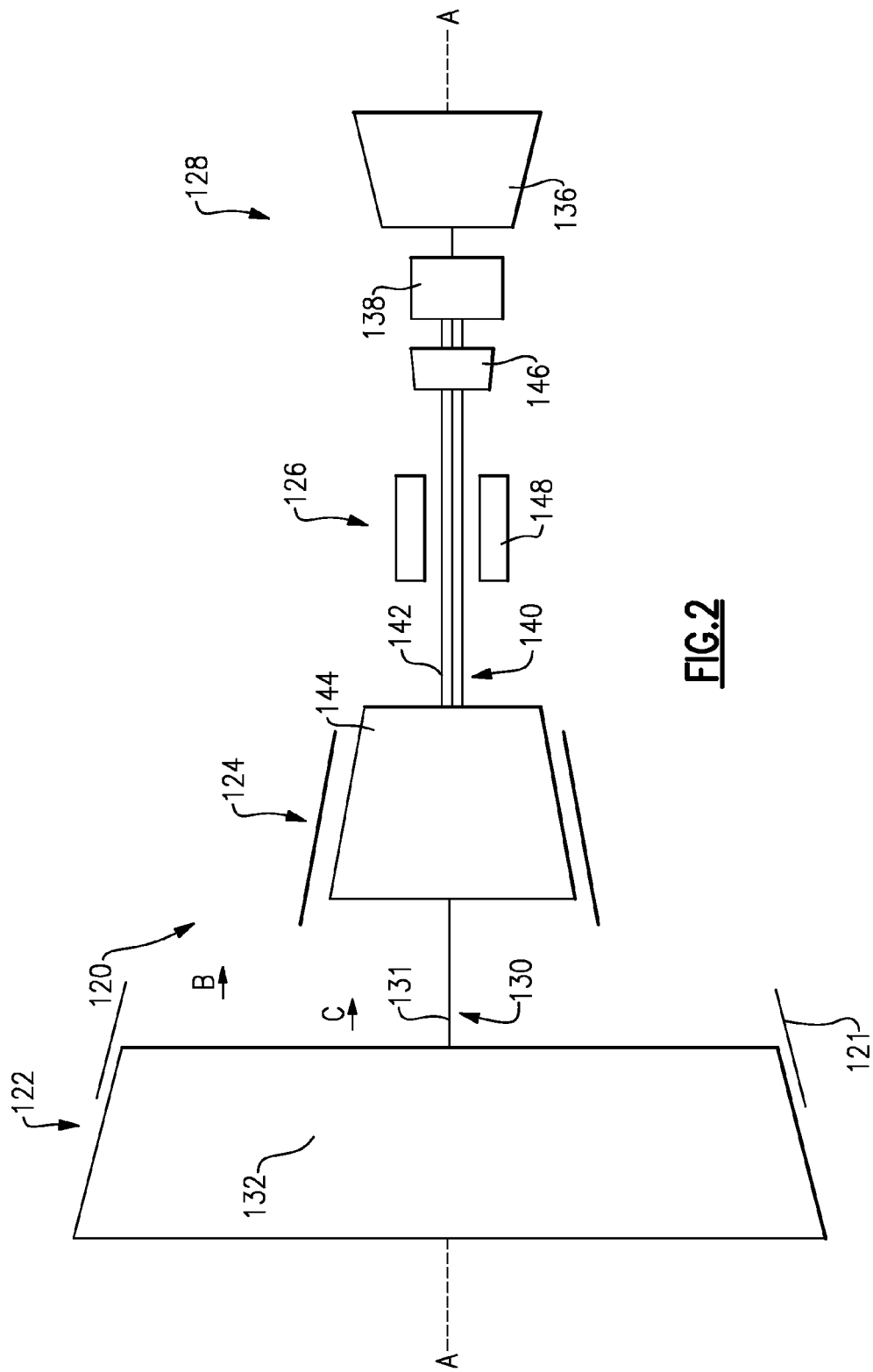
FIG. 2 illustrates a schematic view of a gas turbine engine according to another example embodiment.

FIG. 2 illustrates another example gas turbine engine 120. The gas turbine engine 120 is substantially similar to the gas turbine engine 20 of FIG. 1 except where shown in FIG. 2 or discussed below. The example gas turbine engine 120 is disclosed herein as a two spool turbofan that generally incorporates a fan section 122, a compressor section 124, a combustor section 126, and a turbine section 128.

The exemplary gas turbine engine 120 generally includes a low speed spool 130 and a high speed spool 140 mounted for rotation about an engine central longitudinal axis A. The low speed spool 130 generally includes an inner shaft 131. The inner shaft 131 interconnects a fan 132 and a low pressure turbine 136 through a speed change mechanism 138, such as an epicyclical gearbox that drives the fan 132 via a ring gear. The high speed spool 140 includes an outer shaft 142 that interconnects a high pressure compressor 144 and a high pressure turbine 146.

A combustor 148 is arranged in the exemplary gas turbine engine 120 between the high pressure compressor 144 and the high pressure turbine 146. The inner shaft 131 and the outer shaft 142 are concentric and rotate about the engine central longitudinal axis A which is collinear with their longitudinal axes.

The low pressure turbine 136 rotates at a first rotational speed and the geared architecture 138 reduces the first rotational speed to a second rotational speed axially downstream of the high pressure turbine 146. The fan 132 rotates at the second rotational speed. The high pressure compressor 144 and the high pressure turbine 146 rotate at a third rotational speed different from the first and second rotational speed.

Figure 3:
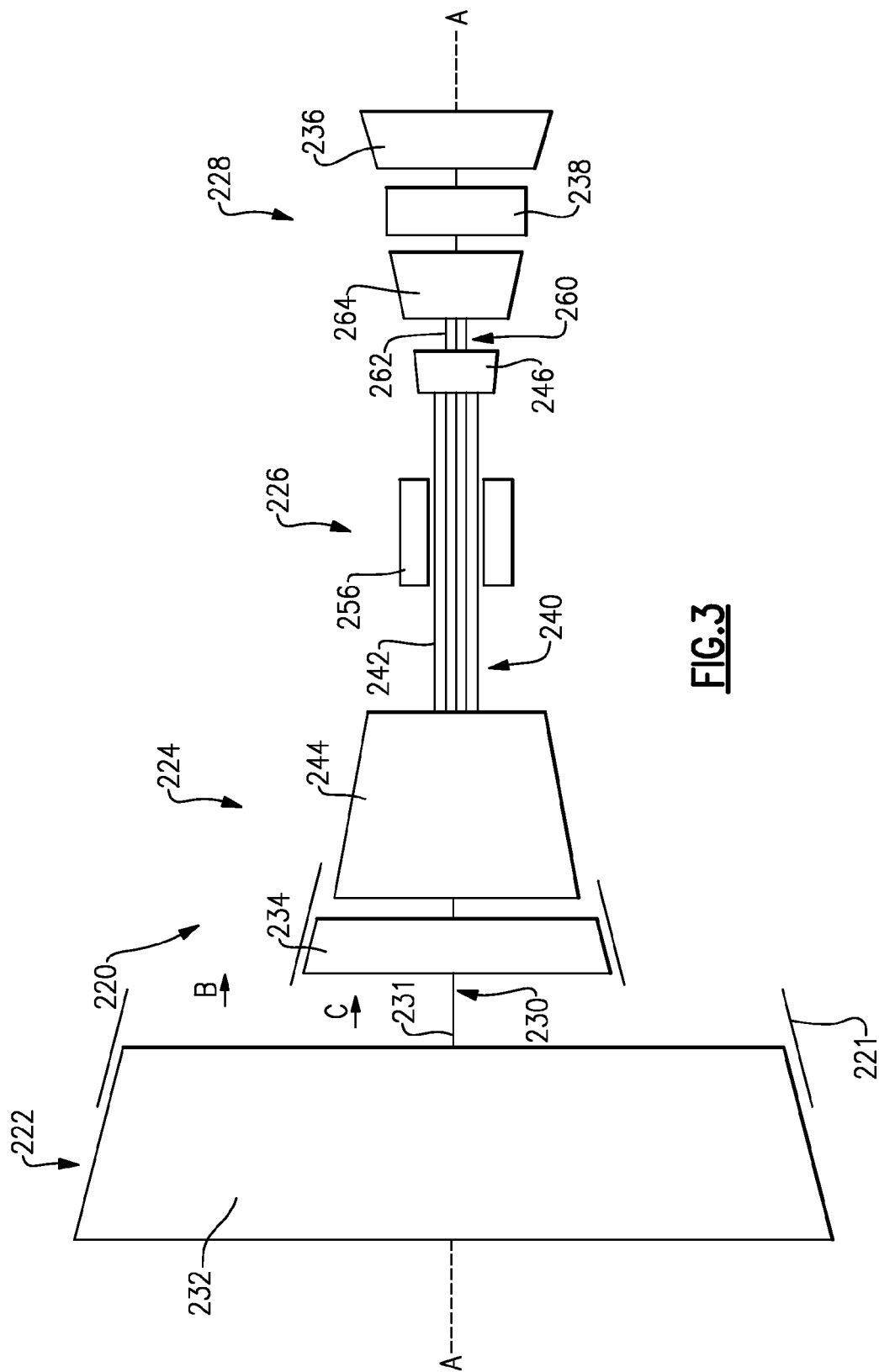
FIG. 3 illustrates a schematic view of a gas turbine according to yet another example embodiment.

FIG. 3 illustrates yet another example gas turbine engine 220. The gas turbine engine 220 is generally the same as the gas turbine engine shown in FIG. 1 except where shown in FIG. 3 or discussed below. The gas turbine engine 220 is disclosed herein as a three spool turbofan that generally incorporates a fan section 222, a compressor section 224, a combustor section 226, and a turbine section 228.

The exemplary gas turbine engine 220 generally includes a low speed spool 230, an intermediate spool 260, and a high speed spool 240 mounted for rotation about an engine central longitudinal axis A. The low speed spool 230 generally includes an inner shaft 231 that interconnects a fan 232 and a speed change mechanism 238, such as an epicyclic gearbox that drives the fan 132 via a ring gear. The intermediate spool 260 generally includes an intermediate shaft 262 that interconnects a low pressure compressor 234 and an intermediate pressure turbine 264. The high speed spool 240 includes an outer shaft 242 that interconnects a high pressure compressor 244 and a high pressure turbine 246.

A combustor 256 is arranged in the exemplary gas turbine engine 220 between the high pressure compressor 244 and the high pressure turbine 246. The inner shaft 231, the intermediate shaft 262, and the outer shaft 242 are concentric and rotate about the engine central longitudinal axis A which is collinear with their longitudinal axes.

A low pressure turbine 236 rotates at a first rotational speed and the geared architecture 238 reduces the first rotational speed to a second rotational speed axially downstream of the intermediate turbine 264. The fan 232 rotates at the second rotational speed. The intermediate shaft 262 rotates at a third rotational speed different than the first or second rotational speed. The outer shaft 242 rotates at a fourth rotational speed different than the first, second, and third rotational speeds.

The preceding description is exemplary rather than limiting in nature. Variations and modifications to the disclosed examples may become apparent to those skilled in the art that do not necessarily depart from the essence of this disclosure. For example, in each of the foregoing embodiments, the ring gear of the speed change mechanism 38, 138, 238 (which would apply in the context of a star epicyclic gearbox) could be replaced with a carrier (which would apply in the context of a planetary epicyclic gearbox). The scope of legal protection given to this disclosure can only be determined by studying the following claims.

What is claimed is:

1. A gas turbine engine comprising:
a drive turbine configured to drive a fan section;
a combustor section located axially upstream of the drive turbine; and
a speed change mechanism located axially downstream of the combustor section and axially upstream of the drive turbine including a sun gear that rotates with the drive turbine at a first rotational speed, wherein an output of the speed change mechanism is connected to the fan section and rotates with the fan section at a second rotational speed different from the first rotational speed.

2. The gas turbine engine of claim 1 wherein the speed change mechanism is an epicyclical gearbox.

3. The gas turbine engine of claim 2 wherein the speed change mechanism includes a ring gear connected to a fan drive shaft that drives the fan section and rotates at the second rotational speed.

4. The gas turbine engine of claim 2, wherein the output of the speed change mechanism includes a planetary carrier connected to a fan drive shaft that drives the fan section at the second rotational speed.

5. The gas turbine engine of claim 1 wherein the output of the speed change mechanism includes a ring gear connected to a fan drive shaft that drives the fan section at the second rotational speed.

6. The gas turbine engine of claim 1 wherein the speed change mechanism is located immediately upstream of the drive turbine.

7. The gas turbine engine of claim 1 including a fan drive shaft connected to the fan and a low pressure compressor connected to the fan drive shaft.

8. The gas turbine engine of claim 1 including a first compressor immediately downstream of the fan section and immediately upstream of the combustor section.

9. A gas turbine engine comprising:
a drive turbine configured to drive a fan section;
a combustor section located axially upstream of the drive turbine;
a speed change mechanism located axially downstream of the combustor section and axially upstream of the drive turbine, an output of the speed change mechanism connected to the fan; and
a high pressure turbine and an intermediate turbine, wherein the speed change mechanism is located immediately downstream of the intermediate turbine and upstream of the drive turbine.

10. The gas turbine engine of claim 9 wherein the high pressure turbine is axially upstream of the intermediate turbine.

11. The gas turbine engine of claim 9 including a low pressure compressor and a high pressure compressor, wherein the low pressure compressor is connected with the intermediate turbine and the high pressure compressor is connected with the high pressure turbine.

12. The gas turbine engine of claim 9 wherein the gas turbine engine is a three spool gas turbine engine.

13. The gas turbine engine of claim 9 wherein the speed change mechanism is an epicyclical gearbox.

14. The gas turbine engine of claim 1 wherein the drive turbine is configured to drive the fan section at a first rotational speed such that a fan blade tip speed of at least one fan blade of the fan section rotates at less than 1400 fps.

15. The gas turbine engine of claim 1 including an overall pressure ratio between approximately 30 and approximately 70.

16. A method of operating a gas turbine engine comprising:
rotating a fan drive turbine at a first rotational speed to drive a sun gear in a speed change mechanism located downstream of a combustor section and up stream of the fan drive turbine at the first rotational speed;
reducing the first rotational speed of the sun gear to a second rotational speed with the speed change mechanism to drive an output of the speed change mechanism at a second rotational speed with a fan section.

17. The method of claim 16 wherein the speed change mechanism is an epicyclical gearbox.

18. The method of claim 16 including rotating a fan and a compressor at the second rotational speed.

19. The method of claim 18 wherein the gas turbine engine is a three spool gas turbine engine.

20. The method of claim 16 including rotating a fan section at the second rotational speed such that a fan blade tip speed of at least one fan blade of the fan section rotates at less than 1400 fps.

21. The method of claim 16 wherein the gas turbine engine includes an overall pressure ratio between approximately 30 and approximately 70.

22. The method of claim 17, wherein the output of the speed change mechanism includes a ring gear connected to a fan drive shaft that drives the fan section at the second rotational speed.

23. The method of claim 17, the output of the speed change mechanism includes a planetary carrier connected to a fan drive shaft that drives the fan section at the second rotational speed.

\* \* \* \* \*